US006007695A

United States Patent [19]

Knall et al.

[11] Patent Number: 6,007,695

[45] Date of Patent: Dec. 28, 1999

[54] SELECTIVE REMOVAL OF MATERIAL USING SELF-INITIATED GALVANIC ACTIVITY IN ELECTROLYTIC BATH

[75] Inventors: N. Johan Knall, Sunnyvale; John D. Porter, Berkeley; Christopher J. Spindt, Menlo Park, all of Calif.

[73] Assignee: Candescent Technologies Corporation, San Jose, Calif.

[21] Appl. No.: 08/940,357

[22] Filed: Sep. 30, 1997

[51] Int. Cl.[6] .............................. B23H 11/00; C23F 1/00

[52] U.S. Cl. .............................. 205/657; 216/90; 216/95; 216/100; 438/746; 438/754

[58] Field of Search .............................. 205/657; 215/90, 215/95; 438/746, 754

[56] References Cited

U.S. PATENT DOCUMENTS

| | | | |
|---|---|---|---|
| 2,334,699 | 11/1943 | Faust | 204/140 |
| 3,174,920 | 3/1965 | Post | 204/143 |
| 3,407,125 | 10/1968 | Fehlner | 204/20 |
| 3,483,108 | 12/1969 | Schaefer | 204/143 |
| 3,539,408 | 11/1970 | Cashau et al. | 205/657 X |
| 3,755,704 | 8/1973 | Spindt et al. | 313/309 |
| 4,208,257 | 6/1980 | Hom-ma et al. | 204/129.65 |
| 4,836,888 | 6/1989 | Nojiri et al. | 156/647 |
| 5,185,057 | 2/1993 | Playdon | 156/642 |
| 5,217,586 | 6/1993 | Datta et al. | 204/129 |
| 5,256,565 | 10/1993 | Bernhardt et al. | 437/228 |
| 5,458,520 | 10/1995 | DeMercurio et al. | 445/24 |
| 5,462,467 | 10/1995 | Macaulay et al. | 445/50 |
| 5,559,389 | 9/1996 | Spindt et al. | 313/310 |
| 5,564,959 | 10/1996 | Spindt et al. | 445/24 |
| 5,766,446 | 6/1998 | Spindt et al. | 205/640 |

FOREIGN PATENT DOCUMENTS

| | | |
|---|---|---|
| 0234989 A1 | 9/1987 | European Pat. Off. . |
| 0697710 A1 | 2/1996 | European Pat. Off. . |
| 0708473 A1 | 4/1996 | European Pat. Off. . |
| WO 95/07543 | 3/1995 | WIPO . |
| WO 96/06443 | 2/1996 | WIPO . |

OTHER PUBLICATIONS

Brodie et al, "Vacuum Microelectronics," *Advances in Electronics and Electron Physics*, vol. 83, 1992, pp. 1–106 (No Month).

Busta, "Vacuum Microelectronics–1992," *J. Micromech. Microeng.*, vol. 2, 1992, pp. 43–74. (No Month).

Datta et al, "Film Breakdown on Nickel under Transpassive Dissolution Conditions in Sodium Nitrate Solutions," *J. Electrochem. Soc.: Electrochemical Science and Technology*, Apr. 1977, vol. 124, No. 4, pp. 483–489.

Datta et al, "On the Influence of Electrolyte Concentraion, pH and Temperature on Surface Brightening of Nickel under ECM Conditions," *J. Applied Electrochemistry*, 1977, pp. 247–252. (No Month).

(List continued on next page.)

*Primary Examiner*—Donald R. Valentine

*Attorney, Agent, or Firm*—Skjerven, Morrill, MacPherson, Franklin & Friel LLP; Ronald J. Meetin

[57] ABSTRACT

Material of a given chemical type is selectively electrochemically removed from a structure by subjecting portions of the structure to an electrolytic bath. The characteristics of certain parts of the structure are chosen to have electrochemical reduction half-cell potentials that enable removal of the undesired material to be achieved in the bath without applying external potential to any part of the structure. The electrolytic bath can be implemented with liquid that is inherently corrosive to, or inherently benign to, material of the chemical type being selectively removed.

53 Claims, 5 Drawing Sheets

OTHER PUBLICATIONS

Datta et al, "On the Role of Mass Transport in High Rate Dissolution of Iron and Nickel in ECM Electrolytes–I. Chloride Solutions," *Electrochimica Acta*, 1980, vol. 25, pp. 1255–1262.

Datta et al, "Surface Brightening During High Rate Nickel Dissolution in Nitrate Electrolytes," *J. Electrochem. Soc.: Electrochemical Science and Technology*, Nov. 1975, pp. 1466–1472.

LaBoda et al, "ECM of Nickel in $NaClO_3$ Solution," *J. Electrochem. Soc.: Electrochemical Science and Technology*, vol. 120, No. 5, May 1973, pp. 643–646.

Landolt et al, "High Rate Anodic Dissolution of Copper," *J. Electrochem. Soc.: Electrochemical Science*, vol. 116, No. 10, Oct. 1969, pp. 1384–1390.

Vaudaine et al, "'Microtips' Fluorescent Display," *Technical Digest*, 1991 International Electron Devices Meeting, Dec. 8–11, 1991, pp. 8.1.1–8.1.4.

SELECTIVE REMOVAL OF MATERIAL USING SELF-INITIATED GALVANIC ACTIVITY IN ELECTROLYTIC BATH

CROSS REFERENCE TO RELATED APPLICATIONS

This is related to Knall et al, U.S. patent application Ser. No. 08/884,700, filed Jun. 30, 1997, now allowed, and to Porter et al, U.S. patent application Ser. No. 08/884,701, also filed Jun. 30, 1997. The contents of Knall et al and Porter et al are incorporated by reference to the extent not repeated herein.

FIELD OF USE

This invention relates to removing undesired portions of material from partially finished structures without removing desired portions of the same type of material, especially when the structures are electron-emitting devices, commonly referred to as cathodes, suitable for products such as cathode-ray tube ("CRT") displays of the flat-panel type.

BACKGROUND ART

A field-emission cathode (or field emitter) contains a group of electron-emissive elements that emit electrons upon being subjected to an electric field of sufficient strength. The electron-emissive elements are typically situated over a patterned layer of emitter electrodes. In a gated field emitter, a patterned gate layer typically overlies the patterned emitter layer at the locations of the electron-emissive elements. Each electron-emissive element is exposed through an opening in the gate layer. When a suitable voltage is applied between a selected portion of the gate layer and a selected portion of the emitter layer, the gate layer extracts electrons from the electron-emissive elements at the intersection of the two selected portions.

The electron-emissive elements are often shaped as cones. Referring to the drawings, FIGS. 1*a*–1*d* illustrate a conventional technique as, for example, disclosed in Spindt et al, U.S. Pat. No. 5,559,389, for creating conical electron-emissive elements in a gated field emitter for a flat-panel CRT display. At the stage shown in FIG. 1*a*, the partially finished field emitter consists of substrate 20, emitter-electrode layer 22, dielectric layer 24, and gate layer 26. Gate openings 28 extend through gate layer 26. Corresponding dielectric openings 30 extend through dielectric layer 24.

Using a grazing-angle deposition procedure, lift-off layer 32 is formed on top of gate layer 26 as depicted in FIG. 1*b*. Emitter material is deposited on top of the structure and into dielectric openings 30 in such a way that the apertures through which the emitter material enters openings 30 progressively close. Generally conical electron-emissive elements 34A are thereby formed in composite openings 28/30. See FIG. 1*c*. Layer 34B of excess emitter material simultaneously forms on top of gate layer 26. Lift-off layer 32 is subsequently removed to lift off excess emitter-material layer 34B. FIG. 1*d* shows the resultant structure.

Using lift-off layer 32 to remove excess emitter-material layer 34B is disadvantageous for various reasons. Portions of the lift-off material invariably accumulate along the side edges of gate layer 26. This reduces the size of the openings through which the emitter material is initially deposited and makes it difficult to scale down electron-emissive elements 34A. The grazing-angle deposition of lift-off layer 32 becomes increasingly difficult as the lateral area of the field emitter increases and thus presents an impediment to scaling up the field-emitter area.

The lift-off material deposition must be performed carefully to assure that no lift-off material accumulates on emitter layer 22 and causes cones 34A to be lifted off during the lift-off of excess layer 34B. Since layer 34B is removed as an artifact of removing lift-off layer 32, particles of the removed emitter material can contaminate the field emitter. Furthermore, deposition of the lift-off material takes fabrication time and therefore money.

Wilshaw, PCT Patent Publication WO 96/06443, discloses a process for manufacturing a gated field emitter in which each electron-emissive element consists of a molybdenum cone situated on a cylinder. The electron-emissive elements are formed over a bottom metal layer. Using an aqueous electrolytic solution, Wilshaw applies an external potential of 2–4 volts to a niobium gate layer in order to electrochemically remove a layer of excess molybdenum that accumulated over the gate layer during the deposition of molybdenum through openings in the gate layer to form the conical portions of the electron-emissive elements.

Just before electrochemically removing the excess molybdenum, Wilshaw removes the bottom metal layer. Consequently, Wilshaw's electron-emissive elements are electrically isolated from one another during the removal of the excess emitter material. Inasmuch as some electron-emissive elements may be electrically shorted to the excess molybdenum during the removal step, Wilshaw needs this isolation to protect the unshorted electron-emissive elements since they could otherwise be electrically shorted through the back metal layer and the shorted elements to the excess molybdenum and thus could be electrochemically attacked in removing the excess molybdenum. Finally, Wilshaw forms a resistive layer over the bottoms of the electron-emissive elements, and a layer of emitter electrodes over the resistive layer.

Wilshaw's electrochemical removal technique avoids the necessity to use to use a lift-off layer for removing the layer of excess emitter material. However, removing the back metal layer before removing the excess molybdenum and then creating emitter electrodes after completing the electrochemical removal is time-consuming and requires several complex processing steps. Applying the external potential to the gate layer entails making an electrical connection to the gate layer, thereby further increasing the fabrication time and complexity. In manufacturing a gated field emitter having electron-emissive elements at least partially shaped as cones, it is desirable to remove a layer containing excess emitter material without incurring the fabrication inefficiency of Wilshaw or the fabrication difficulty involved in utilizing a lift-off layer.

GENERAL DISCLOSURE OF THE INVENTION

The present invention furnishes a time-efficient electrochemical procedure for selectively removing material of a given chemical type from a structure. The removal operation is performed in an electrolytic bath. The characteristics of certain portions of the structure are chosen to have electrochemical reduction half-cell potentials that enable removal of the undesired material to be achieved in the bath without applying external potential to any part of the structure. In this way, the removal operation is galvanically self-initiated. Since there is no need to apply external potential, there is no need to make electrical connections for applying external potential. Consequently, the removal operation can be performed rapidly.

By avoiding the need to apply external potential, it is not necessary to design the structure so as to be capable of receiving external potential during the electrochemical removal operation. A design constraint is thereby lifted. Also, the equipment that provides the electrolytic bath does not have to be configured to permit the application of external potential to the structure. Substantial simplification is achieved in the invention.

The selective removal operation of the invention is performed without the necessity to use a lift-off layer. When excess emitter material accumulates over a structure during the formation of electron-emissive elements of an electron-emitting device, the procedure of the invention can be employed for removing the excess emitter material. The net result is that the invention overcomes the disadvantages of prior lift-off and electrochemical removal techniques for removing excess emitter material.

The electrolytic bath can be implemented in two basic ways. Firstly, the bath can be formed with liquid that is inherently corrosive to (i.e., inherently significantly attacks) material of the type being selectively removed. Secondly, the bath can be formed with liquid that is inherently benign to (i.e., does not inherently significantly attack) material of the type being selectively removed. The reduction half-cell potentials are selected according to specified criteria to accommodate both implementations of the bath. The criteria for the corrosive bath implementation differ suitably from the criteria for the benign bath implementation.

When the electrolytic bath is inherently corrosive to material of the type being selectively removed, the principles of the invention are employed to prevent removal of the material intended to remain while the material intended to be removed dissolves in the bath and is removed. In particular, an initial structure is provided in which an electrically non-insulating primary component containing primary material is electrically coupled to one or more electrically non-insulating additional components. Each additional component contains additional material different from the primary material. The initial structure further includes an electrically non-insulating primary region likewise containing the primary material. The primary region is electrically decoupled from the primary and additional components.

The primary material of the primary region is to be at least partially removed from the structure without removing any significant part of the primary material of the primary component. To accomplish this in accordance with the invention, the primary and additional materials are subjected to an electrolytic bath inherently corrosive to the primary material in order remove at least part of the primary material of the primary region. By appropriately choosing the primary and additional materials, the additional material of each additional component is at sufficiently lower reduction half-cell potential in the bath than the primary material of the primary component that the primary material of the primary component is prevented from being significantly attacked in the bath. The primary material of the primary component thus remains in place as the primary material of the primary region is at least partially removed.

Largely the reverse occurs when the bath is inherently benign to material of the type being selectively removed. In this case, the principles of the invention are employed to cause the material intended to be to dissolve in the bath and be removed while the material intended to remain is unaffected and remains. Specifically, an initial structure is provided in which an electrically non-insulating primary region containing primary material is electrically coupled to one or more further regions. Each further region contains further material different from the primary material. The initial structure further includes an electrically non-insulating primary component containing the primary material. The primary component is substantially electrically decoupled from the primary and further regions.

Again, the primary material of the primary region is to be at least partially removed without removing any significant part of the primary material of the primary component. This case, however, differs from the previous case in that each further region here is electrically coupled to material intended to be removed rather than, as in the previous case, having each additional component electrically coupled to material intended to remain. To at least partially remove the primary material of the primary region according to this implementation of the invention, the primary and further materials are subjected to an electrolytic bath inherently benign to the primary material so that the primary material of the primary component is largely unaffected by the bath. By appropriately choosing the primary and further materials, the primary material of the primary region is of sufficiently greater reduction half-cell potential in the bath than the further material of the further region that at least part of the primary material of the primary region is removed.

In both implementations of the bath, the primary material is typically metal. Likewise, each additional or further material is typically metal.

Inasmuch as the present electrochemical removal technique is performable without a necessity to apply external potential to any part of the structure from which material is being selectively removed, the invention (a) permits substantial simplification in the design of the structure, (b) likewise permits simplification in the equipment that furnishes the electrolytic bath, and (c) enables the removal operation to be performed quickly. The invention thus provides a large advance over the prior art.

BRIEF DESCRIPTION OF THE DRAWINGS

Like reference symbols are employed in the drawings and in the description of the preferred embodiments to represent the same, or very similar, item or items.

DESCRIPTION OF THE PREFERRED EMBODIMENTS

The present invention utilizes self-initiated galvanic activity for removing excess emitter material in creating electron-emissive elements for a gated field-emission cathode. Each such field emitter is suitable for exciting phosphor regions on a faceplate in a cathode-ray tube of a flat-panel display such as a flat-panel television or a flat-panel video monitor for a personal computer, a lap-top computer, or a workstation.

In the following description, the term "electrically insulating" (or "dielectric") generally applies to materials having a resistivity greater than $10^{10}$ ohm-cm. The term "electrically non-insulating" thus refers to materials having a resistivity less than or equal to $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 1 volt/$\mu$m.

Examples of electrically conductive materials (or electrical conductors) are metals, metal alloys, metal-semiconductor compounds (such as metal silicides), and metal-semiconductor eutectics. Electrically conductive materials also include semiconductors doped (n-type or p-type) to a moderate or high level. Electrically resistive materials include intrinsic and lightly doped (n-type or p-type) semiconductors. Further examples of electrically resistive materials are (a) metal-insulator composites, such as cermet (ceramic with embedded metal particles), (b) forms of carbon such as graphite, amorphous carbon, and modified (e.g., doped or laser-modified) diamond, (c) and certain silicon-carbon compounds such as silicon-carbon-nitrogen.

Figure 1A:
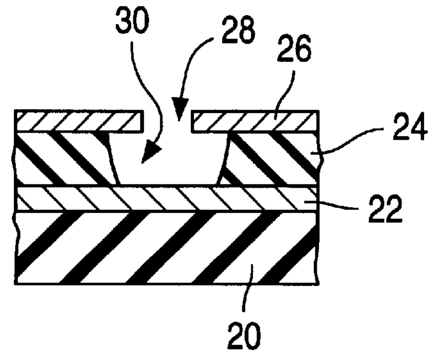
Fig. 1a PRIOR ART
FIGS. 1*a*–1*d* are cross-sectional structural views representing steps in a prior art process for creating electron-emissive elements of an electron emitter.
Figure 1B:
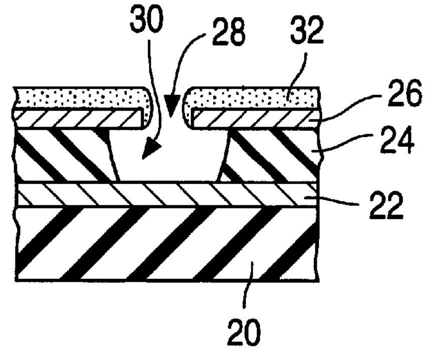
Fig. 1b PRIOR ART
Figure 1C:
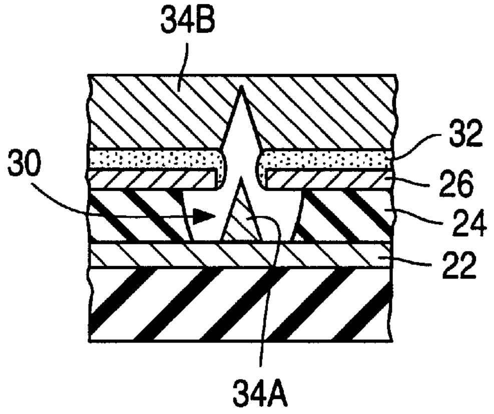
Fig. 1c PRIOR ART
Figure 1D:
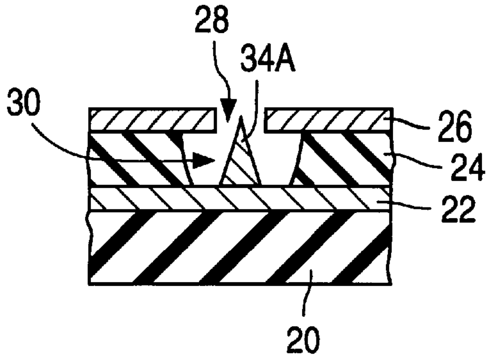
Fig. 1d PRIOR ART
Figure 2A:
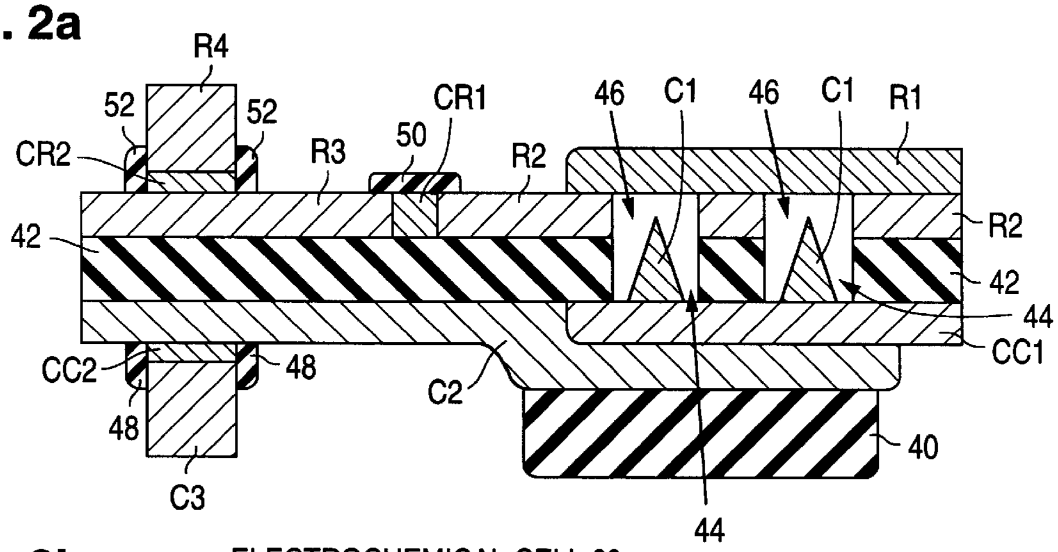
FIGS. 2*a*–2*c* are schematic cross-sectional views representing steps in a process sequence that follows the invention's electrochemical teachings for selectively removing material from a structure, such as a gated field emitter, during the creation of components, such as conical electron-emissive elements.
Figure 2B:
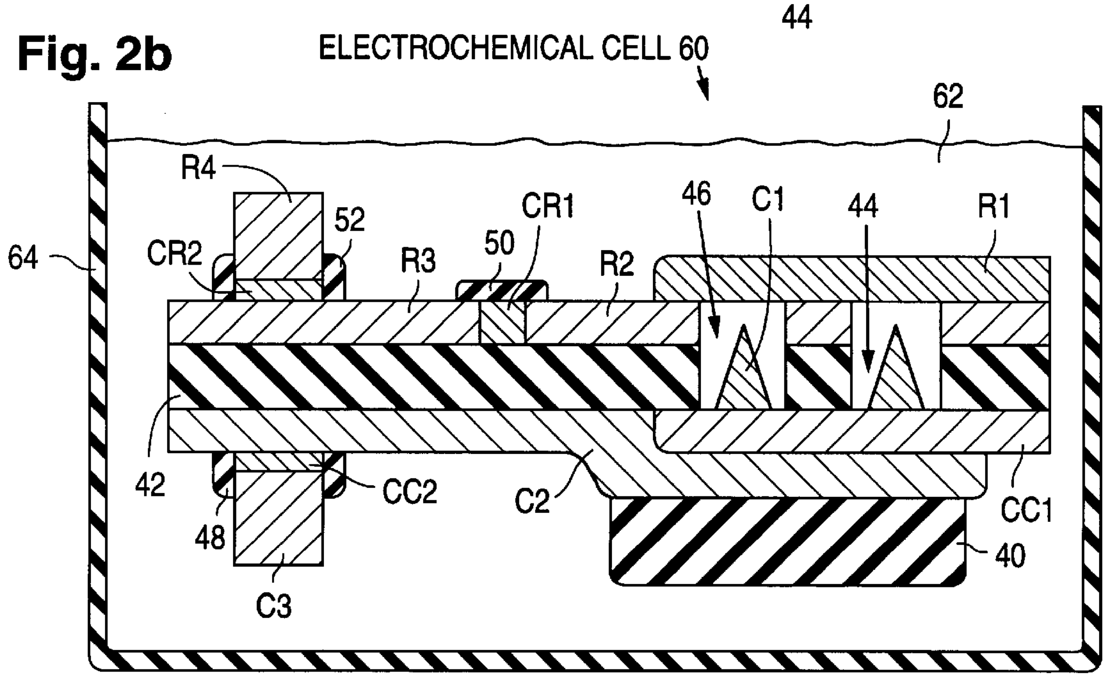
Figure 2C:
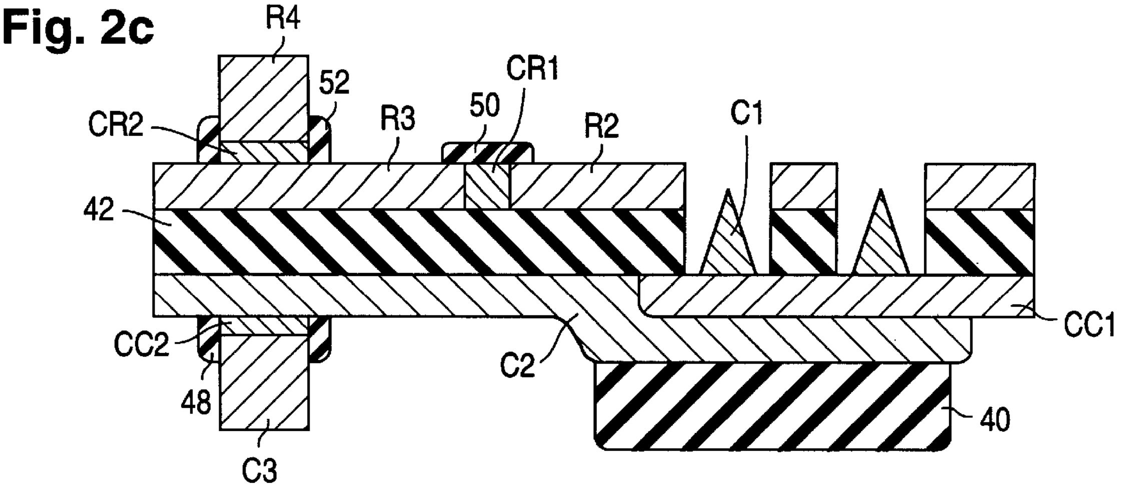

FIGS. 2*a*–2*c* (collectively "FIG. 2") illustrate a process sequence that employs the invention's teaching for selectively removing material during the fabrication of a device such as a field-emission cathode. The configuration of the structure shown in FIG. 2 is depicted schematically in order to bring out the major features of the process sequence. A more realistic depiction of the structure that arises when a field emitter is fabricated in accordance with the invention is presented below in connection with FIGS. 5*a* and 5*b*. Also, to illustrate the various combinations and permutations that arise in applying the invention's teachings, the structure shown in FIG. 2 includes some components and/or regions that may not actually be utilized in fabricating a real field emitter.

Referring to FIG. 2*a*, the starting point for selectively removing material according to the invention is to create a structure containing a multiplicity of similarly shaped, similarly sized primary electrically non-insulating components C1, an additional electrically non-insulating component C2, a primary electrically non-insulating region R1, and a further electrically non-insulating region R2. Beginning near the bottom of FIG. 2*a*, additional component C2 is normally one of a plurality of emitter electrodes in a field emitter. Component C2 is typically situated on top of an electrically insulating substrate 40. In a field emitter, substrate 40 typically consists of glass or ceramic. An intermediate dielectric layer 42, normally consisting of silicon oxide or silicon nitride in a field emitter, is situated on top of component C2.

Primary components C1 normally constitute electron-emissive elements in a field emitter. The electron-emissive elements are typically in the shape of cones, as illustrated by the conical shaping of components C1 in FIG. 2*a*, but can have other shapes. Components C1 are situated respectively in openings 44 extending through dielectric layer 42 and are electrically coupled to component C2. The coupling is normally made through an electrically non-insulating coupling component CC1. In a field emitter, coupling component CC1 is normally a resistive layer having a high resistivity. Alternatively, components C1 can directly contact component C2. In this case, coupling component CC1 is normally absent.

Further region R2 is situated on top of dielectric layer 42. The tops of components C1 extends into openings 46 that respectively extend through region R2. Each opening 46 and the underlying one of openings 44 together form a composite opening 44/46 that laterally surrounds one of components C1. In a field emitter, region R2 is part of a patterned gate layer that controls the extraction of electrons from electron-emissive elements implemented with components C1. Primary region R1 is situated on top of region R2 above openings 46 and components C1. In a field emitter, region R1 is usually a layer of excess emitter material that accumulates on region R2 during the formation of components C1 as electron-emissive elements. Importantly, each of regions R1 and R2 is spaced apart from, and electrically decoupled from, each of components C1, C2, and CC1.

In addition to the foregoing components and regions, the initial structure may contain an additional electrically non-insulating component C3 electrically coupled to component C2. When additional component C3 is present in a field emitter, component C3 normally serves as an emitter contact pad for the emitter electrode implemented with component C2. FIG. 2*a* depicts component C3 as being electrically coupled through an electrically non-insulating component CC2 to component C2. In this case, a layer 48 of electrically insulating material normally surrounds the portion of coupling component CC2 not contacting component C2 or C3. Coupling component CC2 may be absent. In that case, component C3 directly contacts component C2. Components C3 and CC2 are electrically decoupled from regions R1 and R2.

The initial structure may have a further electrically non-insulating region R3 electrically coupled to region R2. When further region R3 is present in a field emitter, region R3 is normally a main control electrode that combines with one or more portions of region R2 to form a composite control electrode R2/R3 extending generally perpendicular to the emitter electrode implemented with component C2. FIG. 2*a* illustrates region R3 as being electrically coupled through an electrically non-insulating coupling region CR1 to region R2. A layer 50 of electrically insulating material normally fully covers the portion of coupling region CR2 not contacting dielectric layer 42 or region R2 or R3. Coupling region CR3 may be absent in which case region R3 directly contacts region R2.

Also the initial structure may have a further electrically non-insulating region R4 electrically coupled to region R3. When further region R4 is present in a field emitter, region R4 normally serves as a control contact pad for regions R2 and R3 implemented as a composite control electrode. FIG. 2*a* illustrates region R4 as being electrically coupled through an electrically non-insulating coupling region CR2 to region R3. A layer 52 of electrically insulating material normally surrounds the portion of coupling region CR2 not contacting region R3 or R4. Coupling region CR2 may be absent. Region R4 then directly contacts region R3. Regions R3, R4, CR1, and CR2 are electrically decoupled from components C1, C2, CC1, and CC2.

Primary region R1 and all of primary components C1 contain a primary electrically non-insulating material M1. Primary material M1 is normally the principal constituent of region R1 and typically forms substantially all of region R1. The same applies to each of components C1. However, region R1 may include one or more materials other than material M1. If so, material M1 is normally present along a substantial fraction of the outside surface of region R1. Again, the same applies to each of components C1. As described below, the electrochemical teachings of the invention are utilized to remove material M1 of region R1 (and thus typically all, or nearly all, of region R1) without removing any significant portion of any of components C1 provided that they are electrically isolated from regions R1 and R2.

Further region R2 is substantially formed with further electrically non-insulating material MR2 different from primary material M1. In particular, region R2 normally contains substantially none of material M1.

Additional component C2 substantially consists of additional electrically non-insulating material MC2. Material MC2 is normally different from materials Ml and MR2. Nonetheless, depending on various factors, including the constituency of component C3 and the particular electrochemical procedure employed to remove material M1 of region R1, material MC2 can be the same, or largely the same, as material M1.

Additional component C3 is substantially formed with additional electrically non-insulating material MC3. Additional material MC3 is normally different from additional material MC2, especially if material MC2 is the same, or largely the same, as primary material M1. In any case, material MC3 is different from material M1.

Further regions R3 and R4 respectively consist substantially of further electrically non-insulating materials MR3 and MR4. Further materials MR3 and MR4 each differ from primary material M1. Material MR4 also normally differs from material MR3, especially if material MR3 is the same, or largely the same, as material MR2. In addition, materials MR3 and MR4 may each differ from materials MC2 and MC3. Specifically, materials MR4 and MC3 normally differ from each other.

Each of materials M1, MC2, MC3, and MR2–MR4 is normally a metal, a metal alloy, or a combination of metals. In some cases, certain of materials M1, MC1, MC2, and MR2–MR4 can additionally or alternatively be formed with other electrically conductive materials such as metal-semiconductor compounds, metal-semiconductor eutectics, and heavily doped semiconductors.

Inasmuch as primary region R1 is normally removed from the structure of FIG. 2*a* by immersing the structure in a suitable electrolytic bath, the resistive material that forms coupling component CC1 has substantially no electrochemical activity that leads to the production of soluble species in the electrolytic bath. Specifically, the electrochemical exchange current density of the material of coupling component CC1 in the bath is insignificant (i.e., negligible) compared to both the electrochemical exchange current density of material M1 of primary region R1 in the bath and the electrochemical exchange current density of material M1 of primary component C1 in the bath. As a result, the electrochemical exchange current of coupling component CC1 is so small that substantially none of component CC1 dissolves in the bath during the time needed to remove region R1 or otherwise affects the removal of region R1. Component CC1 consists essentially of perfectly polarizable material. In a field emitter, the resistive material of component CC1 typically consists of cermet or a silicon-carbon-nitrogen compound.

Each of coupling components CC2, CR1, and CR2 typically consists of a metal or a combination of metals. Insulating layers 48, 50, and 52 consist of electrically insulating materials that respectively fully isolate coupling components CC2, CR1, and CR2 from the electrolytic bath. For this purpose, insulating layer 48 can be formed with an oxide of the metal that typically constitutes component CC2, provided that the oxide furnishes the desired insulation. Alternatively, insulating layer 48 can be a separate electrically insulating membrane. The same applies to insulating layers 50 and 52 respectively relative to components CR1 and CR2.

The initial structure of FIG. 2*a* can be created in various ways. A typical field-emitter example in which components C1 are generally shaped as cones is described below in connection with FIGS. 5*a* and 5*b* for which region R1 accumulates as a layer of excess emitter material during evaporative deposition of material M1 to form components C1. Conical depressions (not shown in FIG. 2*a*) corresponding to the conical shapes of components C1 are then present along the lower surface of region R1. In any event, the next step in the process is to remove primary region R1 without significantly damaging any of primary components C1 electrically isolated from regions R1 and R2.

Primary region R1 can be electrochemically removed according to either of two basic techniques referred to here, for simplicity, as the "corrosive bath" and "benign bath" techniques. The corrosive bath technique is described below in connection with FIGS. 3*a*–3*e*. The benign bath technique is described below in connection with FIGS. 4*a*–4*e*. In both techniques, region R1 is normally removed in a self-initiated galvanic manner without applying, and without the need to apply, any control potential to any part of the structure of FIG. 2*a*. The particular materials, normally metals, that implement materials M1, MC1, MC2, and MR2–MR4 depend on whether the corrosive-bath or benign-bath technique is employed.

The electrochemical removal of region R1 is performed with an electrochemical removal system consisting of an electrochemical cell 60 of the type schematically shown in FIG. 2*b*. Electrochemical cell 60 consists of an electrolytic bath 62 and a cell wall 64. Electrolytic bath 62 is normally a solution but can have components not dissolved in bath 62. Components C1 are shown as pointing upward in FIG. 2*b*. However, components C1 can point in other directions, e.g., sideways relative to the vertical.

Primary region R1 is removed from the structure of FIG. 2*a* by immersing the structure sufficiently far into bath 62 that substantially all the external surface area of components/regions C2, C3, and R1–R4 is in contact with bath 62. This typically entails immersing the structure fully into bath 62. To the extent that coupling component CC1 has external surface area not covered by component C2, this surface area is normally also in contact with bath 62.

At the beginning of the electrochemical removal operation, region R1 normally fully covers openings 44/46 in which components C1 are situated. Consequently, bath 62 is usually not in contact with components C1 at the beginning of the electrochemical removal. As material M1 of region R1 is being removed, a point is eventually reached at which bath 62 enters openings 44/46 and comes into contact with components C1 and the adjoining portions of the surface area of coupling component CC1. Also, region R1 may be porous such that bath 62 passes through region R1 to reach components C1. If component CC1 were absent, bath 62 would come into contact with the adjoining portions of the surface area of component C2.

A small fraction of primary components C1 may be electrically shorted to region R1 or R2 prior to electrochemically removing region R1 and/or may become electrically shorted to region R1 or R2 during the electrochemical removal operation. Such electrical shorting typically occurs as a result of a component C1 being forced into contact with region R2, or as a result of one or more electrically non-insulating particles lodging between a component C1 and region R1 or R2. Since region R2 contacts region R1, any component C1 shorted to region R2 is shorted to region R1.

Any component C1 shorted to region R1 is normally attacked significantly during the electrochemical removal of region R1. The attack normally continues until each such component C1 is no longer shorted to region R1. Due to the high resistivity of coupling component CC1, the remainder of components C1, i.e., those not electrically shorted to region R1, are not significantly electrochemically attacked as region R1 is removed when coupling component CC1 is present.

The selective removal of material M1 is accomplished solely through internal potentials electrochemically generated in the structure under fabrication. This is accomplished by suitably choosing materials M1, MC2, and MR2 and, as appropriate, materials MC3, MR3, and MR4. As noted above, no external control potential needs to be applied to any part of the structure in order to remove selected portions of material M1 in the desired manner. FIG. 2*b* illustrates this case. By so operating, no electrical hook-ups are made to any part of the structure, thereby reducing the total time needed to perform the electrochemical removal. The complexity of electrochemical cell 60 that contains electrolytic bath 62 is also reduced.

It may sometimes be desirable to accelerate the removal of material M1 in region R1 or to provide further assurance that material M1 of unshorted components C1 is not significantly attacked. In such cases, an external potential can be applied to region R1 or C1 for accelerating the selective removal or for protecting unshorted components C1. Nevertheless, the materials that implement materials M1, MC2, MC3, and MR2–MR4 are still chosen to be of a nature that material M1 is selectively removed in the desired manner without the need to apply external potential to any part of the structure under fabrication.

When material M1 forms substantially all of region R1, the electrochemical removal is normally conducted for a time sufficient to enable all of material M1 in region R1 to dissolve in bath 62. Region R1 is thus entirely removed. If region R1 includes a component other than material M1, that component is typically removed at the same time as material M1 in region R1. For example, if the additional component is distributed throughout region R1 (such that material M1 is present along a large fraction of the exterior surface of region R1), the additional component is typically lifted off and carried way in bath 62 as material M1 in region R1 is removed. Bath 62 can be stirred, or otherwise agitated, to assist in removing the additional component. Alternatively, the additional component may simply dissolve in bath 62.

After material M1 of region R1 is completely removed, the structure under fabrication is removed from cell 60, washed, and dried. FIG. 2*c* depicts how the structure under fabrication appears at this point for the typical case in which substantially all of region R1 was electrochemically removed. FIG. 2*c* also depicts the case in which none of the illustrated components C1 were electrically shorted to region R1 prior to the electrochemical removal operation or became shorted to region R1 during the electrochemical removal. The structure of FIG. 2*c* is now ready for additional processing.

Turning back to the selective electrochemical removal of material M1, the electrochemical reduction half-cell potential (often simply "reduction potential") $E_o$ in electrolytic bath 62 is one of the main parameters utilized in selecting materials M1, MC2, MC3, and MR2–MR4. FIGS. 3*a*–3*e* (collectively "FIG. 3") illustrate relationships among reduction potentials $E_o$ in bath 62 for certain components/regions of the structure under fabrication in the corrosive bath case. FIGS. 4*a*–4*e* (collectively "FIG. 4") illustrate relationships among reduction potentials $E_o$ for certain components/regions of the structure in the benign bath case.

Reduction potentials $E_o$ for the different components/regions are differentiated by the parenthetical information following each $E_o$ symbol. Reduction potentials $E_o$ for material M1 of component C1 and region R1 in bath 62 are respectively identified by the parenthetical symbols $M1_{C1}$, and $M1_{R1}$. The parenthetical symbols MC2, MC3, MR2, MR3, and MR4 respectively indicate reduction potentials $E_o$ for components/regions MC2, MC3, and MR2–MR4 in bath 62.

Letting M represent an arbitrary material of soluble ionic species $M^{n+}$, the following half-cell reaction involving material M has a reduction potential $E_o$ (M):

$$M^{n+}ne^{-} \leftrightharpoons M(s) \tag{1}$$

where e indicates electron, n indicates the number of electrons in the ionic form of material M, and s indicates solid. Reduction proceeds from the left to the right in reaction 1. Also, each potential $E_o$ (M) is the reduction half-cell potential of material M at the pressure (fugacity) and concentration (activity) of material M actually present in bath 62. The standard reduction half-cell potential $E^o$ (M) at 1-atmosphere pressure and 1-molal concentration is typically close to the actual reduction potential $E_o$ (M).

The values of reduction potential $E_o$ (M) are prescribed relative to the hydrogen standard for which the standard reduction half-cell potential $E^o$ (H) of the hydrogen reaction:

$$H^{+} + e^{-} \rightleftarrows \frac{1}{2}H_2(g) \tag{2}$$

is set at 0 volt, where g indicates gas. A positive value for potential $E_o$ (M) means that the following reaction proceeds to the right to reduce material M by converting it from ionic form to solid form:

$$M^{n+} + \frac{n}{2}H_2(g) \rightleftarrows M(s) + nH^{+} \tag{3}$$

A negative value for potential $E_o$ (M) means that reaction 3 proceeds to the left to oxidize material M, thereby converting it from solid form to ionic form.

In determining the $E_o$ relationships that implement the corrosive bath and benign bath techniques of the invention, a material that has substantially no capability to donate or accept electrons in bath 62 has substantially no effect on the $E_o$ relationships. Since coupling component CC1 has very little electrochemical exchange current capability in bath 62 and thus effectively zero electron-donating/electron-accepting capability in bath 62, the presence of component CC1 is ignored in determining the present $E_o$ relationships. The electron-donating and/or electron-accepting capabilities of coupling components CC2, CR1, and CR2 might be significant if they were brought into contact with bath 62. However, each of components CC2, CR1, and CR2 is fully isolated from bath 62. Accordingly, the presence of components CC2, CR1, and CR2 is also ignored in determining the $E_o$ relationships for the corrosive bath and benign bath techniques.

With the foregoing in mind, bath 62 is inherently corrosive to (or corrosive of) material M1 in the corrosive bath technique whose $E_o$ relationships are qualitatively shown in FIG. 3. That is, when a substance consisting solely of material M1 is immersed in bath 62, the substance is oxidized and converted into M1 ions that dissolve in bath 62. The essence of the corrosive bath technique is to choose materials M1, MC2, and MR2 and, when present, materials MC3, MR3, and MR4 so as to produce internal potentials that prevent material M1 of unshorted primary components C1 from being dissolved in bath 62 while material M1 of primary region R1 is permitted to dissolve in bath 62.

The corrosive bath technique is implemented by choosing material M1 of primary component C1, material MC2 of additional component C2, and (when present) material MC3 of additional component C3 to have reduction potentials $E_o$ of such a nature in bath 62 that material M1 of components C1 is subjected to an internally generated electrochemical potential which prevents substantially any of the material M1 of unshorted components C1 from dissolving in bath 62. Specifically, the reduction potentials $E_o$ (MC2) and $E_o$ (MC3) of components C2 and C3 in bath 62 are sufficiently less than the reduction potential $E_o$ ($M1_{C1}$) of material M1 of components C1 in bath 62 that bath 62 does not significantly attack material M1 of unshorted component C1. In this regard, no electrically non-insulating component having a higher reduction potential $E_o$ in bath 62 than $E_o$ ($M1_{C1}$) and having significant electrochemical reduction exchange current in bath 62 relative to the electrochemical exchange current of material M1 of components C1 in bath 62 is electrically coupled to components C1 while the structure under fabrication is immersed in bath 62.

The trade-off for preventing material M1 of unshorted components C1 from being dissolved in bath 62 is that at least part of material MC2 (of component C2) and/or material MC3 (of component C3) is oxidized and dissolved in bath 62. The electrons supplied by material MC2 and/or material MC3 form an electrochemical charging current that serves to maintain a sufficiently negative interfacial potential on the surfaces of components C1 in bath 62. If all of materials MC2 and MC3 dissolve in bath 62 before all of material M1 of region R1 is removed, bath 62 starts attacking material M1 of unshorted component C1. To prevent this from happening, the rate of dissolution of material M1 of region R1 in bath 62 is arranged to exceed the total rate of dissolution of materials MC2 and MC3 in bath 62.

Furthermore, component C2 is often a component in the final structure being fabricated. The removal of a large fraction of material MC2 is typically unacceptable. In fact, the removal of anything more than a small fraction of material MC2 is often unacceptable. Accordingly, the rate of dissolution of material M1 of region R1 in bath 62 must normally be much greater than the rate of dissolution of material MC2 in bath 62, the amount of difference in the dissolution rates depending on how much size reduction can be tolerated in component C2.

Like comments sometimes apply to component C3, also typically a component in the final structure being fabricated. However, as discussed further below, more size reduction can often be tolerated in component C3 than in component C2.

Figure 3A:
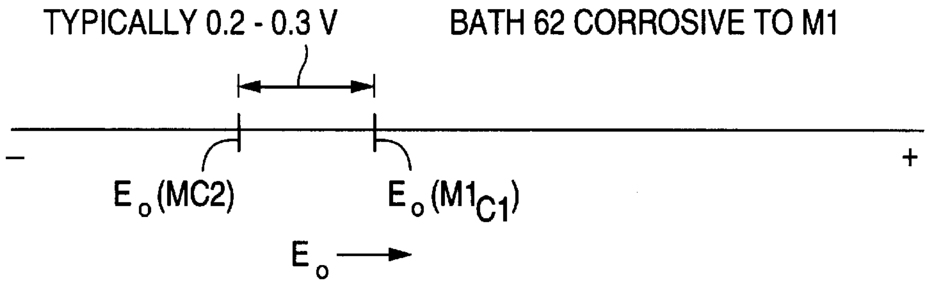
FIGS. 3*a*–3*e* are diagrams that present relationships among reduction half-cell potentials suitable for implementing the process of FIGS. 2*a*–2*c* with an electrolytic bath inherently corrosive to the material being selectively removed.

To better understand the criteria for selecting reduction potentials $E_o$ ($M1_{C1}$), $E_o$ (MC2), and $E_o$ (MC3) in the corrosive bath technique, consider the situation in which additional region R3 is absent. Reduction potential $E_o$ (MC2) is then less than reduction potential $E_o$ ($M1_{C1}$) as depicted in FIG. 3*a*. To prevent material M1 of component C1 from being dissolved in bath 62, potential $E_o$ (MC2) need only be slightly less than $E_o$ ($M1_{C1}$). Typically, $E_o$ (MC2) need be no more than 0.2–0.3 volt less than $E_o$ ($M1_{C1}$) . $E_o$ (MC2) can, however, be more than 0.2–0.3 volt below $E_o$ ($M1_{C1}$).

Figure 3B:
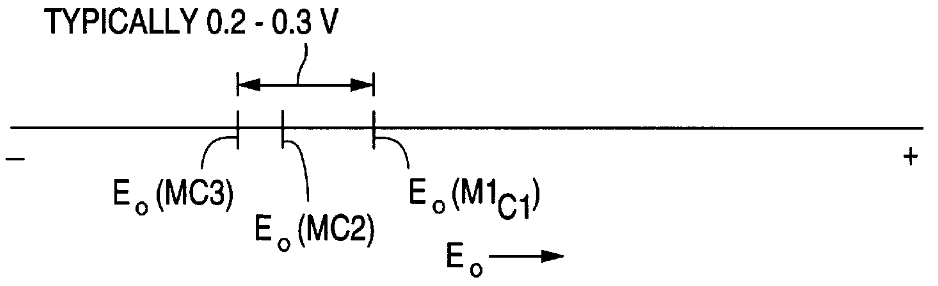
Figure 3C:
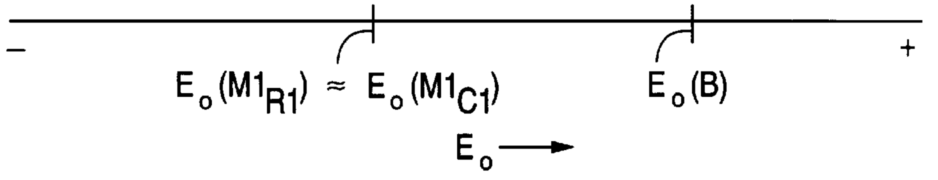

Next, consider the situation in which component C3 is present in the structure under fabrication when it is immersed in bath 62. Potentials $E_o$ (MC2) and $E_o$ (MC3) are both less than potential $E_o$ ($M1_{C1}$) as shown in FIG. 3*b*. Consistent with the earlier example of FIG. 3*a*, potentials $E_o$ (MC2) and $E_o$ (MC3) need only be slightly less than, typically no more than 0.2–0.3 volt less than, $E_o$ ($M1_{C1}$) to prevent material M1 of unshorted components C1 from being oxidized.

Component C2 is typically a critically sized component located in the core of the device, e.g., a field emitter, being fabricated. Accordingly, anything more than minimal size reduction in component C2 is normally unacceptable. Component C3, on the other hand, is typically located at the periphery of the device under fabrication and can be initially provided at a sufficiently oversized thickness so as to tolerate a substantial amount of dissolution during the removal of region R1. In particular, component C3 can serve, in part, as a sacrificial component for preserving component C2.

The preceding situation is achieved by arranging for potential $E_o$ (MC3) to be less than potential $E_o$ (MC2). This situation is depicted in FIG. 3b. An additional benefit of choosing $E_o$ (MC3) to be less than $E_o$ (EC2) is that the degree of anti-dissolving protection furnished to unshorted components C1 is increased beyond what would occur if component C3 were absent or consisted substantially of material MC2.

The rate at which material MC2 dissolves in bath 62 increases greatly as the difference $E_o$ ($M1_{C1}$)–$E_o$ (MC2) increases. Likewise, the rate at which material MC3 dissolves in bath 62 increases greatly as the difference $E_o$ ($M1_{C1}$)–$E_o$ (MC3) increases. When a significant loss in material MC2 and/or material MC3 is unacceptable, arranging for potential $E_o$ ($M1_{C1}$) to be considerably greater than $E_o$ (MC2) and/or $E_o$ (MC3) is generally undesirable. The maximum amount of difference $E_o$ ($M1_{C1}$)–$E_o$ (MC2) or $E_o$ ($M1_{C1}$)–$E_o$ (MC3) is typically 1 volt in such a situation.

If the structure under fabrication includes any further electrically non-insulating component (a) electrically coupled to component C1, (b) electrically decoupled from region R1, and (c) subjected to bath 62, the reduction potential $E_o$ for each such component is chosen in accordance with the foregoing pattern. In other words, potential $E_o$ for each such further component is less than $E_o$ ($M1_{C1}$) but no more than approximately 1 volt less than $E_o$ ($M1_{C1}$) . Assuming that such a further component is electrically coupled to component C1 through components C2 and C3, potential $E_o$ of the further component is chosen to lie between potentials $E_o$ (MC2) and $E_o$ (MC3) if it is desired that component C3 provide anti-dissolution protection to the further component. Conversely, if it is desired that the further component furnish anti-dissolution protection to component C3 (and thus also to components C2 and C1), potential $E_o$ of the further component is the lowest reduction potential.

For bath 62 to be inherently corrosive to material M1, bath 62 has a component B that undergoes reduction having a reduction potential $E_o$ (B) greater than the reduction potential $E_o$ ($M1_{R1}$) of material M1 of region R1 in bath 62. See FIG. 3*c*. Reduction potential $E_o$ ($M1_{R1}$) is typically close to $E_o$ ($M1_{C1}$). In addition, the exchange current density of the reduction involving component B is relatively high at the exposed surface of region R1. In being reduced, component B accepts (or takes) electrons from material M1 of region R1 in order to oxidize material M1 of region R according to the reaction:

$$M1(S)_{R1} \leftrightarrows M1^{n+} + ne^- \quad (4)$$

Reaction 4 also occurs in the vicinity of material M1 of unshorted components C1. By choosing potentials $E_o$ ($M1_{C1}$), $E_o$ (MC2), and $E_o$ (MC3) in the manner described above for the corrosive bath technique, the electrons donated by dissolving materials MC2 and MC3 reach material M1 of unshorted component C1 at a greater rate than they are removed by reaction 4. Unshorted components C1 become negatively charged. This inhibits bath 62 from converting atoms of unshorted components C1 into positively charged M1 ions.

Figure 3D:
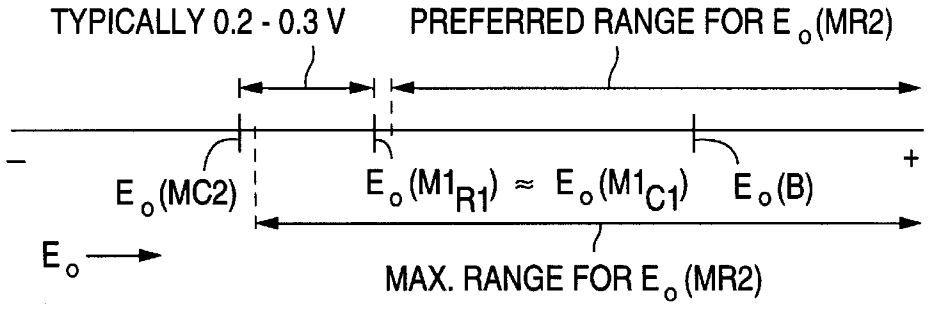

Performance of the corrosive bath technique additionally entails choosing material MR2 of further region R2 and, when present, materials MR3 and MR4 of further regions R3 and R4 to have reduction potentials $E_o$ of such a nature in bath 62 that material M1 of region R1 continues to dissolve in bath 62 even though region R1 is electrically coupled to regions R2–R4. This is achieved by arranging for the reduction potential $E_o$ (MR2) of material MR2 in region R2 and, when existent (i.e., when regions R3 and R4 are present), the reduction potentials $E_o$ (MR3) and $E_o$ (MR4) of materials MR3 and MR4 in regions R3 and R4 to be greater than potential $E_o$ (MC2) and, when existent (i.e., when component C3 is present), potential $E_o$ (MC3). Reduction potentials $E_o$ (MC2), $E_o$ (MC3), and $E_o$ (MC4) can be less than, or greater than, potential $E_o$ ($M1_{R1}$). The preceding $E_o$ conditions are illustrated in FIG. 3*d* for the case in which components/regions C3, R3, and R4 are absent. Potential $E_o$ (MR2) can be substantially anywhere in the range exceeding $E_o$ (MC2).

Figure 3E:
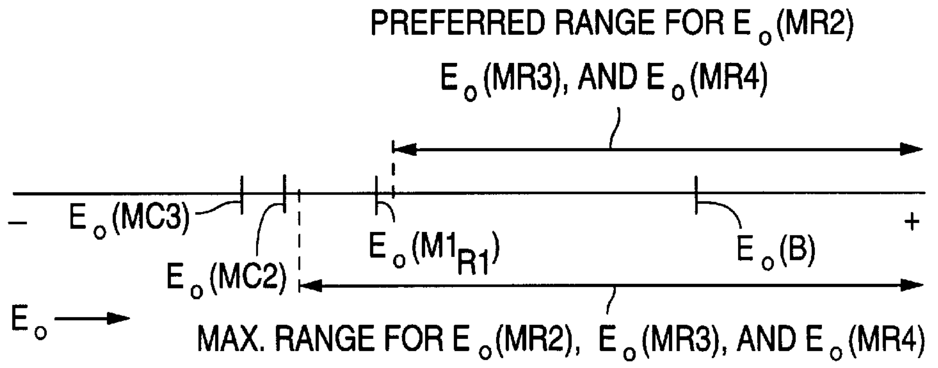

FIG. 3*e* depicts the preceding $E_o$ conditions for the case in which components/regions C3, R3, and R4 are present in the structure under fabrication when it is immersed in bath 62, potential $E_o$ (MC3) being less than $E_o$ (MC2). In this case, potentials $E_o$ (MR2), $E_o$ (MR3), and $E_o$ (MR4) can lie anywhere in the range exceeding $E_o$ (MC2).

Potentials $E_o$ (MR2) and, when existent, potentials $E_o$ (MR3) and $E_o$ (MR4) are preferably all greater than $E_o$ ($M1_{R1}$). Arranging potentials $E_o$ ($M1_{R1}$) and $E_o$ (MR2) through $E_o$ (MR4) in this manner accelerates the rate at which material M1 of region R1 is oxidized and removed from the structure under fabrication. The removal rate increases as the weighted average of potentials $E_o$ (MR2) through $E_o$ (MR4) increases relative to potential $E_o$ ($M1_{R1}$), where the weighting is based on the exchange current densities of materials MR2–MR4 as discussed below in connection with the benign bath technique.

Materials M1, MC2, and MR2 and, when present, materials MC3, MR3, and MR4 are selected in accordance with the foregoing criteria to implement the corrosive bath technique. The characteristics of coupling components CC1, CC2, CR1 and CR2 play no part in the $E_o$ relationships for the corrosive bath technique. At least material M1 of region R1, and typically all of region R1, is then removed without significantly attacking unshorted components C1 and without the need to apply external potential to the structure under fabrication.

Turning to the benign bath technique of the invention, bath 62 is inherently benign to (i.e., substantially non-corrosive to) material M1 for which the relevant $E_o$ relationships are qualitatively shown in FIG. 4. In other words, when a substance consisting solely of material $M_o$ is brought into contact with bath 62, substantially nothing happens to the substance. The essence of the benign bath technique is to choose materials M1, MC2, and MR2 and, when present, materials MC3, MR3, and MR4 so as to produce internal electrochemical potentials that cause material M1 of region R1 to be electrochemically oxidized and dissolved in bath 62 while material M1 of unshorted components C1 remains substantially unaffected.

The benign bath technique is implemented by choosing material M1 of region R1, material MR2 of region R2, and (when present) materials MR3 and MR4 of regions R3 and R4 to have reduction potentials $E_o$ of such a nature in bath 62 that material M1 of region R1 is subjected to an internally generated electrochemical potential that causes material M1 of region R1 to dissolve in bath 62. Specifically, reduction potentials $E_o$ (MR2), $E_o$ (MR3), and $E_o$ (MR4) in bath 62 are sufficiently higher than reduction potential $E_o$ ($M1_{R1}$) in bath 62 that bath 62 dissolves material M1 of region R1. The rate at which material M1 of region R1 dissolves in bath 62 increases as potentials $E_o$ (MR2), $E_o$ (MR3), and $E_o$ (MR4) increase relative to $E_o$ ($M1_{R1}$) . To enable material M1 of region R1 to be removed at a rate acceptable for commercial production, at least one of potentials $E_o$ (MR2), $E_o$ (MR3), and $E_o$ (MR4) needs to be considerably greater than $E_o$ ($M1_{R1}$).

Figure 4A:
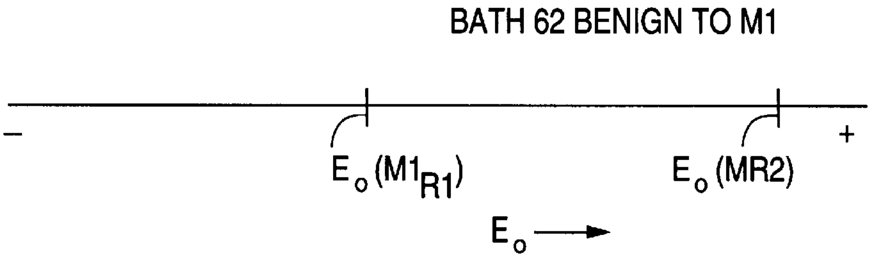
FIGS. 4*a*–4*e* are diagrams that present relationships among reduction half-cell potentials suitable for implementing the process of FIGS. 2*a*–2*c* with an electrolytic bath inherently benign to the material being selectively removed.
Figure 4B:
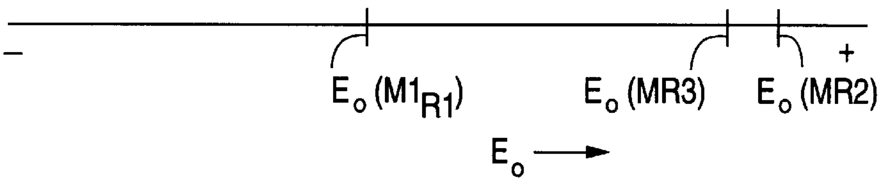
Figure 4C:
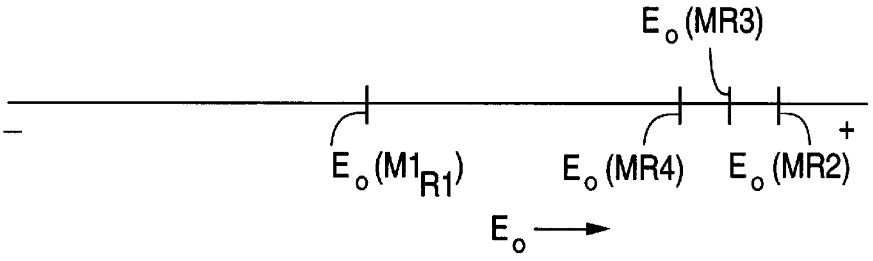

FIG. 4*a* represents the situation in which regions R3 and R4 are absent. Potential $E_o$ (MR2) is then considerably greater than $E_o$ ($M1_{R1}$) . FIG. 4*b* represents the situation in which region R3 is present but region R4 is absent. Potentials $E_o$ (MR2) and $E_o$ (MR3) are both considerably greater than $E_o$ ($M1_{R1}$) . With region R2 typically being present to a lesser extent than region R3, $E_o$ (MR3) is typically less than $E_o$ (MR2) . Finally, FIG. 4*c* represents the situation in which regions R3 and R4 are both present. Potentials $E_o$ (MR2) through $E_o$ (MR4) are all considerably greater than $E_o$ ($M1_{R1}$). Typically, $E_o$ (MR4) is less than $E_o$ (MR3) which, in turn, is less than $E_o$ (MR2).

If the structure under fabrication includes any additional electrically non-insulating region (a) electrically coupled to region R1, (b) electrically decoupled from unshorted components C1, and (c) subjected to bath 62, the reduction potential $E_o$ for each such additional region is selected in accordance with the pattern that applies to potentials $E_o$ (MR2) to $E_o$ (MR4). Also, no electrically non-insulating region having a lower reduction potential $E_o$ in bath 62 than $E_o$ ($M1_{R1}$) and having a greater rate of dissolution in bath 62 than material M1 of region R1 is electrically coupled to region R1 while the structure under fabrication is immersed in bath 62.

When the structure under fabrication contains region R3 and/or region R4, the combination of region R2 with region R3 and/or region R4 acts like a composite electrically non-insulating region whose reduction potential $E_o$ (R) is the weighted average of potentials $E_o$ (MR2) through $E_o$ (MR4). The weighting is defined largely by the exchange currents of materials MR2–MR4 in bath 62. If the exchange current of one of materials MR2–MR4 is much greater than the exchange current of the other two of materials MR2–MR4, weighted-average reduction potential $E_o$ (R) approximately equals the reduction potential $E_o$ of the region having the highest exchange current. The $E_o$ criteria for the benign bath technique can be summarized into the single criterion that weighted-average potential $E_o$ (R) be considerably greater than $E_o$ ($M1_{R1}$).

The exchange currents of materials MR2–MR4 are determined by their exchange current densities and their surface areas exposed to bath 62. To a first approximation, exchange current is the product of exchange current density and exposed surface area. This approximation can be used to estimate total exchange current and to adjust weighted average reduction potential $E_o$ (R). The selection of materials MR2–MR4 for a particular application depends on various factors. A material desirable for use as material MR2 or MR3 may sometimes have such a low reduction potential $E_o$ that weighted-average potential $E_o$ (R) is undesirably low. If so, one technique for overcoming the problem is to cover the material with electrical insulation so that the material has substantially zero exchange current and thus does not pull down potential $E_o$ (R). In essence, region R2 or R3 here is converted into coupling region CR1 or CR2 so as to drop out of the $E_o$ criteria. Meeting the $E_o$ criteria is a threshold requirement in the benign bath technique for enabling material M1 of region R1 to be removed from the structure under fabrication. In addition, some mechanism must be employed to remove electrons from region R1 at a rate sufficiently high that material R1 oxidizes at a commercially acceptable rate. This is typically achieved by arranging for at least one of materials MR2–MR4 to have a high electrochemical reduction exchange current. The total electron-accepting capability of regions R2–R4 is then high so that material M1 of region R1 is removed rapidly.

Depending on various factors, it may sometimes be difficult to select materials MR2–MR4 to meet both the $E_o$ criteria and the reduction exchange current requirement for the benign bath technique. If the $E_o$ criteria can be met but the necessary reduction exchange current cannot be readily achieved with the materials selected for materials MR2–MR4, an alternative technique for removing electrons from region R1 at the requisite high rate is to provide bath 62 with an extra component X that undergoes a reduction reaction in bath 62 at a high electrochemical reduction exchange current. In this alternative, the reduction potential $E_o$ (X) of extra component X exceeds potential $E_o$ ($M1_{R1}$).

One example of component X is oxygen. When bath 62 is saturated with oxygen, reduction of oxygen occurs according to a complex sequence of reactions dependent upon solution pH. In one case, the reduction of oxygen can be represented by the reaction:

$$O_2+2e^- \rightleftarrows O_2^{-2} \quad (5)$$

Another example of component X is iron in the +3 state. Reduction of iron in the +3 state occurs in bath 62 according to:

$$Fe^{+3}+e^- \rightleftarrows Fe^{+2} \quad (6)$$

Reactions 5 and 6 both have high electrochemical reduction exchange current densities on many surfaces.

When component X is introduced into bath 62 for removing electrons, weighted-average potential $E_o$ (R) is modified to include the effect of component X. That is, the self-generated potential that causes material M1 of region R1 to be oxidized is the difference between potential $E_o$ ($M1_{R1}$) and the weighted average of potentials $E_o$ (MR2) through $E_o$ (MR4) and extra-component potential $E_o$ (X). Since the weighting is based on electrochemical exchange currents, resultant weighted-average potential $E_o$ (R) approximately equals $E_o$ (X). In other words, component X dominates the removal procedure in both the $E_o$ aspects and the exchange current aspects.

Figure 4D:
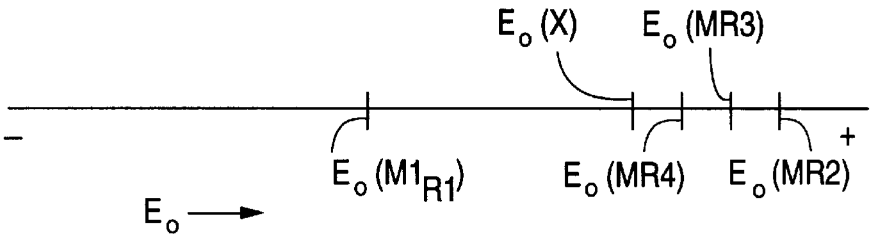
Figure 4E:
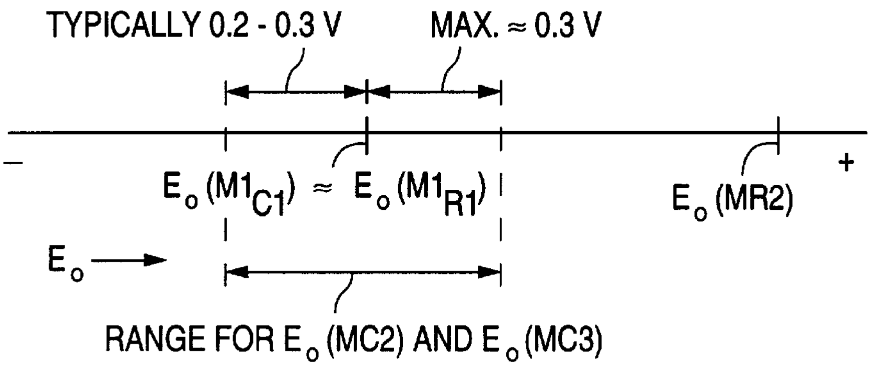

Extra-component potential $E_o$ (X) may variously be greater than, or less than, potentials $E_o$ (MR2) through $E_o$ (MR4). If potential $E_o$ (X) exceeds $E_o$ (MR2), a reduction involving component X can cause material MR2 to corrode (oxidize) under certain circumstances. The same applies to material MR3 or MR4 if $E_o$ (X) exceeds $E_o$ (MR3) or $E_o$ (MR4). Such corrosion of materials MR2–MR4 can be prevented by choosing potential $E_o$ (X) to be less than each of $E_o$ (MR2) through $E_o$ (MR4) . This situation is depicted in FIG. 4*d*.

Performance of the benign bath technique further involves selecting material MC2 of additional component C2 and, when present, material MC3 of additional component C3 to have reduction potentials $E_o$ of such a nature that unshorted components C1 do not dissolve in bath 62. Protecting unshorted component C1 is accomplished by arranging for potential $E_o$ (MC2) and, when existent, potential $E_o$ (MC3) to be no more than approximately 0.3 volt greater than $E_o$ ($M1_{C1}$). See FIG. 4*e*. Again, potentials $E_o$ ($M1_{C1}$) and $E_o$ ($M1_{R1}$) are generally of approximately equal value.

Potentials $E_o$ (MC2) and $E_o$ (MC3) are each preferably less than $E_o$ ($M1_{C1}$), typically 0.2–0.3 volt less than $E_o$ ($M1_{C1}$). If potential $E_o$ (MC2) is considerably less than $E_o$ ($M1_{C1}$), material MC2 can be corroded (oxidized) significantly. The same applies to potential $E_o$ (MC3) with respect to material MC3. In a situation where such corrosion is unacceptable, potentials $E_o$ (MC2) and $E_o$ (MC3) are normally no more than 1 volt less than $E_o$ ($M1_{C1}$).

The materials that implement materials M1, MR2, and MC2 and, when present, materials MR3, MR4, and MC3 are selected in accordance with the foregoing $E_o$ and exchange current criteria to implement the benign bath technique. As with the corrosive bath technique, the characteristics of coupling components CC1, CC2, CR1, and CR2 play no part in the criteria for the benign bath technique. At least part of material M1 of region R1, and typically all of region R1, is again removed without significantly attacking unshorted components C1 and without the need to apply external control potential to the structure under fabrication.

When resistive coupling component CC1 is present in the structure under fabrication and has high resistivity, the short circuiting of a small fraction of components C1 to region R1 or R2 normally does not impair the ability to remove material M1 of region R1 without significantly removing material M1 of unshorted components C1. Each shorted component C1 is largely at the potential of region R1. The potential difference that would normally exist between region R1 and a shorted component C1 if it were not shorted to region R1 largely drops across the resistive material of component CC1. In effect, component CC1 electrically isolates components C1 from one another. Each unshorted component C1 is thus effectively electrically isolated from each shorted component C1.

Inasmuch as each shorted component C1 is largely at the potential of region R1, each shorted component C1 is effectively part of region R1 during at least an initial part of the electrochemical removal operation. Hence, each shorted component C1 is electrochemically attacked until a sufficient amount of material M1 has been removed from region R1 and/or that component C1 to produce a suitably wide gap between the then-existing remainder of region R1 and any remainder of that component C1. When the gap reaches such a width that the potential on originally shorted component C1 drops below the value needed to oxidize material M1 of that component C1, the attack on that component C1 terminates.

The electrochemical attack on a shorted component C1 sometimes terminates when only a relatively small portion of that component C1 has been removed. Depending on how much of a previously shorted component C1 remains and how that remainder is shaped, the remaining portion of that component C1 may be able to adequately perform its intended function. In any event, electrical shorts between components C1, on one hand, and regions R1 and R2, on the other hand, are eliminated (repaired) by utilizing either the corrosive bath or benign bath technique of the invention.

Figure 5A:
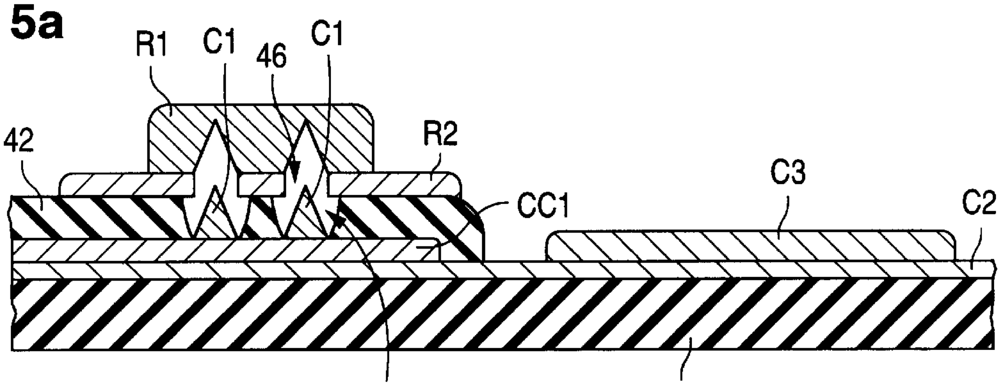
FIGS. 5*a* and 5*b* are cross-sectional views representing steps in implementing the process sequence of FIGS. 2*a*–2*c* to create conical electron-emissive elements in a gated field emitter.
Figure 5B:
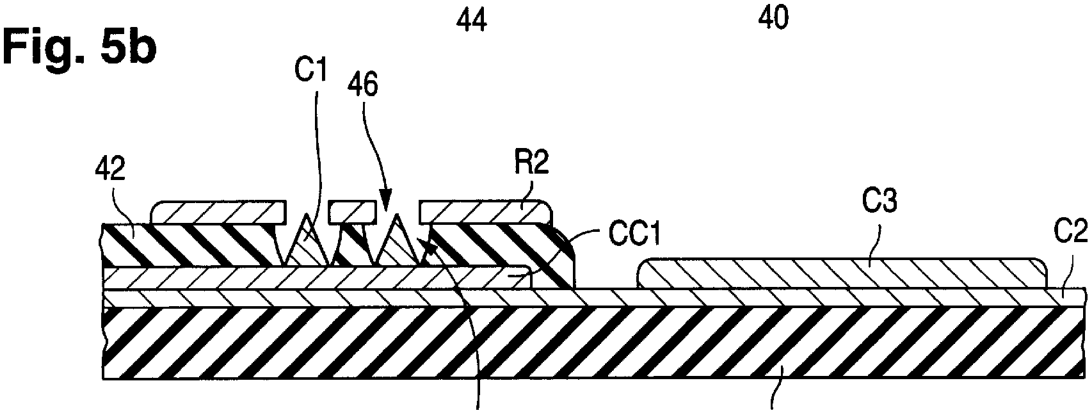

FIGS. 5a and 5b (collectively "FIG. 5") present an example of how the process sequence of FIG. 2 is employed in fabricating a field emitter in which primary components C1 are conical electron-emissive elements. FIG. 5a illustrates the appearance of the exemplary structure immediately before performing the electrochemical removal procedure of the invention to simultaneously remove each of a group of primary regions R1. Only one region R1 is shown in FIG. 5a. Regions R1 consists of excess material M1 utilized in forming electron-emissive cones C1.

In addition to cones C1 and excess emitter-material regions R1, the initial structure of FIG. 5a contains a group of additional components C2, a corresponding group of additional components C3, a coupling component CC1, a group of further regions R2, insulating substrate 40, and intermediate dielectric layer 42. FIG. 5a illustrates only one component C2, only one component C3, and only one region R2. Substrate 40 typically consists of a transparent electrical insulator such as glass. Dielectric layer 42 is typically silicon oxide.

Components C2 in FIG. 5a are emitter electrodes, each of which extends horizontally in the plane of the figure. Each component C3 is a contact pad for corresponding emitter electrode C2. The total exposed surface area of emitter contact pad C3 is typically at least 10 times the total exposed surface area of excess emitter-material regions R1. Regions R2 are gate electrodes, each of which extends perpendicularly to the plane of FIG. 5a and thus perpendicular to emitter electrodes C2. The total exposed surface area of gate electrodes R2 is typically at least 10 times the total exposed surface area of excess emitter-material regions R1.

In an implementation of the corrosive bath technique, material M1 of cones C1 and excess regions R1 is typically nickel. Gate electrodes R2, emitter electrodes C2, and emitter contact pads C3 respectively are platinum, chromium, and aluminum. Electrolytic bath 62 is an aqueous solution of 0.1 molar phosphoric acid with dissolved oxygen in the corrosive bath implementation.

In an implementation of the benign bath technique, material M1 of cones C1 and excess regions R1 is typically molybdenum. Gate electrodes R2 and emitter contact pads C3 again respectively are platinum and aluminum. However, emitter electrodes C2 are tantalum in the benign bath implementation.

Electrolytic bath 62 in the benign bath implementation is an electrolytic solution formed with an organic solvent, an acid, and dissolved oxygen. Bath 62 may also contain a salt. The organic solvent, the acid, and the salt can be chosen as described in Porter et al, U.S. Pat. application Ser. No. 08/884,701, cited above. For example, the organic solvent can be dimethylsulfoxide. The acid can be paratoluenesulfonic acid at a molar concentration (moles/liter) of 0.1–1.5, typically 0.5. The salt can be tetraethylammonium paratoluenesulfonate at a molar concentration of 0.05–0.75, typically 0.1. The dissolved oxygen constitutes component X.

FIG. 5b illustrates how the initial structure appears after having been immersed in electrolytic bath 62 for a period long enough that excess emitter-material regions R1 are entirely removed. Electron-emissive cones C1 are now exposed through openings 46 in gate electrodes R2. For the corrosive bath technique, emitter contact pads C3 are slightly reduced in size as shown in FIG. 5b. As indicated above, some reduction in the size of contact pads C3 can also occur with the benign bath technique.

Figure 6:
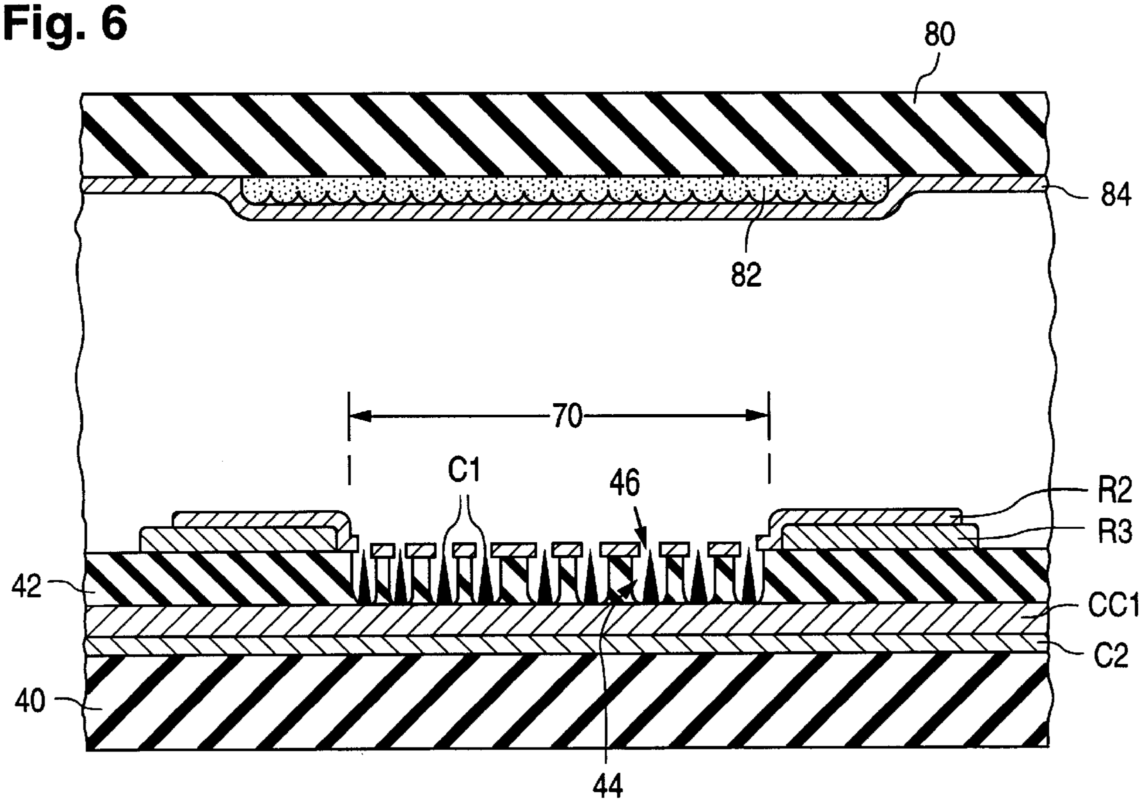
FIG. 6 is a cross-sectional structural view of a flat-panel CRT display that includes a gated field emitter having electron-emissive elements fabricated in accordance with the invention.

FIG. 6 depicts a typical example of the core active region of a flat-panel CRT display that employs an area field emitter, such as one similar to that of FIG. 5b, manufactured according to the invention. Substrate 40 forms the baseplate for the CRT display. Each emitter-electrode component C2 is situated along the interior surface of baseplate 40.

In the example of FIG. 6, the field emitter contains a group of further regions R3 extending perpendicular to emitter electrodes C2. Regions R3, one of which is shown in FIG. 6, constitute main control electrodes. Each main control electrode R3 contains one or more main control apertures 70. Regions R2 in FIG. 6 are gate portions that span main control apertures 70 in the indicated manner. Each main control electrode R3 and the adjoining gate portions R2 form a composite control electrode. Electron-emissive cone C1 in FIG. 6 are arranged in laterally separated sets of electron-emissive cones. Each set of cones C1 are exposed through gate openings 46 laterally bounded by a corresponding one of main control apertures 70.

A transparent, typically glass, faceplate 80 is located across from baseplate 40. Light-emitting phosphor regions 82, one of which is shown in FIG. 6, are situated on the interior surface of faceplate 80 directly across from corresponding main control apertures 70. A thin light-reflective layer 84, typically aluminum, overlies phosphor regions 82 along the interior surface of faceplate 80. Electrons emitted by electron-emissive elements C1 pass through light-reflective layer 84 and cause phosphor regions 82 to emit light that produces an image visible on the exterior surface of faceplate 80.

The core active region of the flat-panel CRT display typically includes other components not shown in FIG. 6. For example, a black matrix situated along the interior surface of faceplate 80 typically surrounds each phosphor region 82 to laterally separate it from other phosphor regions 82. Focusing ridges provided over interelectrode dielectric layer 42 help control the electron trajectories. Spacer walls are utilized to maintain a relatively constant spacing between backplate 40 and faceplate 80.

When incorporated into a flat-panel CRT display of the type illustrated in FIG. 6, a field emitter manufactured according to the invention operates in the following way. Light-reflective layer 84 serves as an anode for the field-emission cathode. The anode is maintained at high positive potential relative to the gate and emitter lines.

When a suitable potential is applied between (a) a selected one of emitter electrodes C2 and (b) a selected one of composite control electrodes R2/R3, gate portion R2 of the so-selected control electrode R2/R3 extracts electrons from electron-emissive elements C1 at the intersection of the two selected electrodes and controls the magnitude of the resulting electron current. Desired levels of electron emission typically occur when the applied gate-to-cathode parallelplate electric field reaches 20 volts/mm or less at a current density of 0.1 mA/cm$^2$ as measured at phosphor-coated faceplate 80 when phosphor regions 82 are high-voltage phosphors. Upon being hit by the extracted electrons, phosphor regions 82 emit light.

Directional terms such as "lower" and "upper" have been employed in describing the present invention to establish a frame of reference by which the reader can more easily understand how the various parts of the invention fit together. In actual practice, the components of an electron-emitting device may be situated at orientations different from that implied by the directional terms used here. The same applies to the way in which the fabrication steps are performed in the invention. Inasmuch as directional terms are used for convenience to facilitate the description, the invention encompasses implementations in which the orientations differ from those strictly covered by the directional terms employed here.

While the invention has been described with reference to particular embodiments, this description is solely for the purpose of illustration and is not to be construed as limiting the scope of the invention claimed below. For instance, metals different from the ones specified above can be selected for components C1–C3, region R2, and (when variously present) regions R3 and R4 in the field emitters of FIGS. 5*b* and 6. Electron-emissive elements C1 can have shapes other than cones. One example is cones on pedestals.

Substrate 40 can be deleted if emitter-electrode component C2 and resistive component CC1 are of sufficient total thickness to support the structure. Insulating substrate 40 can be replaced with a composite substrate in which a thin insulating layer overlies a relatively thick non-insulating layer that furnishes structural support.

The electrochemical removal technique of the invention can be used in fabricating ungated electron emitters. The electron emitters produced according to the invention can be employed to make flat-panel devices other than flat-panel CRT displays. Examples include products utilized in electron spectroscopy, in generating X rays or microwaves from electron beams, and in evaporating materials by electron-beam heating. Various modifications and applications may thus be made by those skilled in the art without departing from the true scope and spirit of the invention as defined in the appended claims.

We claim:

1. A method comprising the steps of:

providing an initial structure in which (a) an electrically non-insulating primary component comprising primary material is electrically coupled to at least one electrically non-insulating additional component, (b) each additional component comprises additional material different from the primary material, and (c) an electrically non-insulating primary region also comprising the primary material is substantially electrically decoupled from the primary and additional components; and subjecting the primary and additional materials to an electrolytic bath to remove at least part of the primary material of the primary region, the additional material of each additional component being of sufficiently lower reduction half-cell potential in the bath than the primary material of the primary component to prevent the bath from significantly attacking the primary material of the primary component.

2. A method as in claim 1 wherein the subjecting step comprises bringing the primary and additional materials into contact with the bath.

3. A method as in claim 1 where at least part of the primary material of the primary region is removed during the subjecting step without a necessity to apply external potential to the primary region or to any of the components.

4. A method as in claim 1 wherein at least part of the primary material of the primary region is removed during the subjecting step without applying external control potential to the primary region or to any of the components.

5. A method as in claim 1 wherein each of the primary and additional materials comprises metal.

6. A method as in claim 1 wherein the primary material of the primary region is of higher dissolution rate in the bath than every additional component.

7. A method as in claim 1 wherein no electrically non-insulating component having greater reduction half-cell potential in the bath than the primary material of the primary component and having significant electrochemical reduction exchange current capability in the bath relative to the primary material of the primary component is electrically coupled to the primary component and is subjected to the bath during the subjecting step.

8. A method as in claim 1 wherein the primary material of the primary component is electrically coupled to the additional material of one such additional component through at least one electrically resistive coupling component of insignificant exchange current capability in the bath relative to the primary material of the primary component.

9. A method as in claim 1 wherein the primary material of the primary component substantially contacts the additional material of one such additional component.

10. A method as in claim 1 wherein the additional material of each additional component is no more than approximately 1 volt lower in reduction half-cell potential in the bath than the primary material of the primary component.

11. A method as in claim 1 wherein the bath contains an electrolytic component of higher reduction half-cell potential in the bath than the primary material of the primary region.

12. A method as in claim 1 wherein one such additional component is electrically coupled to the primary component through another such additional component and is of lower reduction half-cell potential in the bath than that other additional component so as to further prevent the bath from significantly attacking the primary material of the primary component.

13. A method as in claim 1 wherein the additional material of one such additional component substantially contacts the additional material of another such additional component.

14. A method as in claim 1 wherein the additional material of one such additional component is electrically coupled to the additional material of another such additional component through at least one electrically non-insulating coupling component largely electrically isolated from the bath during the subjecting step.

15. A method as in claim 1 wherein:

the providing step includes providing the initial structure with at least one further electrically non-insulating region electrically coupled to the primary region, each further region comprising further material different from the primary material; and the subjecting step includes subjecting the further material of each further region to the bath, the further material of each further region being of greater reduction half-cell potential in the bath than the additional material of each additional component.

16. A method as in claim 15 wherein the further material of each further region is of greater reduction half-cell potential in the bath than the primary material of the primary region.

17. A method as in claim 15 wherein each of the primary, additional, and further materials comprises metal.

18. A method as in claim 15 wherein the primary material of the primary region substantially contacts the further material of one such further region.

19. A method as in claim 15 wherein the primary material of the primary region is electrically coupled to the further material of one such further region through at least one electrically non-insulating coupling region largely electrically isolated from the bath during the subjecting step.

20. A method as in claim 15 wherein the further material of one such further region substantially contacts the further material of another such further region.

21. A method as in claim 15 wherein the further material of one such further region is electrically coupled to the further material of another such further region through at least one electrically non-insulating coupling region largely electrically isolated from the bath during the subjecting step.

22. A method as in claim 1 wherein the providing step includes providing the initial structure with a dielectric layer above one specified such additional component, the dielectric layer having a dielectric opening over which the primary region is situated, the primary component being largely situated in the dielectric opening spaced apart from the primary region.

23. A method as in claim 22 wherein the providing step further includes providing the initial structure with an electrically non-insulating further region between the dielectric layer and the primary region, the further region having a further opening continuous with the dielectric opening.

24. A method as in claim 23 wherein:

the specified additional component forms at least part of an emitter electrode;

the primary component is an electron-emissive element; and the further region forms at least part of a control electrode for the electron-emissive element.

25. A method as in claim 24 wherein:

the primary material of the primary component and the primary region comprises nickel; and the additional material of the specified additional component comprises chromium.

26. A method as in claim 25 wherein the further region comprises platinum.

27. A method comprising the steps of:

providing an initial structure in which (a) an electrically non-insulating primary region comprising primary material is electrically coupled to at least one electrically non-insulating further region, (b) each further region comprises further material different from the primary material, and (c) an electrically non-insulating primary component also comprising the primary material is substantially electrically decoupled from the primary and further regions; and subjecting the primary and further materials to an electrolytic bath which is substantially benign to the primary material of the primary component and for which the further material of each further region is of sufficiently greater reduction half-cell potential in the bath than the primary material of the primary region to cause at least part of the primary material of the primary region to be electrochemically removed from the initial structure.

28. A method as in claim 27 wherein the subjecting step comprises bringing the primary and further materials into contact with the bath.

29. A method as in claim 27 wherein at least part of the primary material of the primary region is removed during the subjecting step without a necessity to apply external potential to the primary component or to any of the regions.

30. A method as in claim 27 wherein at least part of the primary material of the primary region is removed during the subjecting step without applying external control potential to the primary component or to any of the regions.

31. A method as in claim 27 wherein each of the primary and further materials comprises metal.

32. A method as in claim 27 wherein one such further region has electrochemical reduction exchange current capability sufficiently high in the bath to control how rapidly the primary material of the primary region in the bath is electrochemically removed.

33. A method as in claim 27 wherein no electrically non-insulating region having lower reduction half-cell potential in the bath than the primary material of the primary region and having a greater rate of dissolution in the bath than the primary material of the primary region is electrically coupled to the primary region and is subjected to the bath during the subjecting step.

34. A method as in claim 27 wherein the primary material of the primary region substantially contacts the further material of one such further region.

35. A method as in claim 27 wherein the primary material of the primary region is electrically coupled to the further material of one such further region through at least one electrically non-insulating coupling region largely electrically isolated from the bath during the subjecting step.

36. A method as in claim 27 wherein the further material of one such further region substantially contacts the further material of another such further region.

37. A method as in claim 27 wherein the further material of one such further region is electrically coupled to the further material of another such further region through at least one electrically non-insulating coupling region largely electrically isolated from the bath during the subjecting step.

38. A method as in claim 27 wherein the bath contains a special electrolytic component of higher reduction half-cell potential in the bath than the primary material of the primary region.

39. A method as in claim 38 wherein the special component is of lower reduction half-cell potential in the bath than the further material of each further region.

40. A method as in claim 38 wherein the special component is of electrochemical reduction exchange current capability sufficiently high in the bath to control how rapidly the primary material of the primary region is electrochemically removed.

41. A method as in claim 27 wherein:

the providing step includes providing the initial structure with at least one electrically non-insulating additional component electrically coupled to the primary component, each additional component comprising additional material different from the primary material; and the subjecting step includes subjecting the additional material of each additional component to the bath, the additional material of each additional component being no more than approximately 0.3 volt higher in reduction half-cell potential in the bath than the primary material of the primary component.

42. A method as in claim 41 wherein each of the primary, further, and additional materials comprises metal.

43. A method as in claim 41 wherein the additional material of each additional component is of lower reduction half-cell potential in the bath than the primary material of the primary component.

44. A method as in claim 41 wherein the additional material of each additional component is no more than approximately 1 volt lower in reduction half-cell potential in the bath than the primary material of the primary component.

45. A method as in claim 41 wherein the primary material of the primary component is electrically coupled to the additional material of one such additional component through at least one electrically resistive coupling component of insignificant exchange current capability in the bath relative to the primary material of the primary component.

46. A method as in claim 41 wherein the primary material of the primary component substantially contacts the additional material of one such additional component.

47. A method as in claim 41 wherein the additional material of one such additional component substantially contacts the additional material of another such additional component.

48. A method as in claim 41 wherein the additional material of one such additional component is electrically coupled to the additional material of another such additional component through at least one coupling component largely electrically isolated from the bath during the subjecting step.

49. A method as in claim 27 wherein the providing step includes providing one specified such further region above the dielectric layer in the initial structure, the specified further region and the dielectric layer having a composite opening, the primary region situated over the further region above the opening, the primary component situated in the opening spaced apart from the primary region and the specified further region.

50. A method as in claim 49 wherein the providing step further includes providing the dielectric layer over an electrically non-insulating additional component in the initial structure, the additional component being electrically coupled to the primary component.

51. A method as in claim 50 wherein:

the additional component forms at least part of an emitter electrode;

the primary component is an electron-emissive element; and the specified further region forms at least part of a control electrode for the electron-emissive element.

52. A method as in claim 51 wherein:

the primary material of the primary region and the primary component comprises molybdenum; and the further material of the specified further region comprises platinum.

53. A method as in claim 52 wherein the additional component comprises tantalum.

* * * * *